United States Patent
Coffin et al.

(10) Patent No.: US 9,033,653 B2
(45) Date of Patent: *May 19, 2015

(54) GAS TURBINE ENGINE FAN DRIVE GEAR SYSTEM DAMPER

(71) Applicant: United Technologies Corporation, Hartford, CT (US)

(72) Inventors: James B. Coffin, Windsor, CT (US); John R. Otto, Middletown, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,706

(22) Filed: Apr. 8, 2014

(65) Prior Publication Data

US 2014/0219783 A1 Aug. 7, 2014

Related U.S. Application Data

(63) Continuation of application No. 14/036,927, filed on Sep. 25, 2013, now Pat. No. 8,827,633, which is a continuation of application No. 13/557,515, filed on Jul. 25, 2012, now Pat. No. 8,573,926, which is a continuation of application No. 13/432,699, filed on Mar. 28, 2012, now Pat. No. 8,529,197.

(51) Int. Cl.
*F01D 15/12* (2006.01)
*F01D 25/04* (2006.01)
(Continued)

(52) U.S. Cl.
CPC ............ *F01D 15/12* (2013.01); *Y10T 74/19642* (2015.01); *F01D 25/04* (2013.01); *F02C 7/36* (2013.01); *F02K 3/06* (2013.01); *F05D 2260/40311* (2013.01); *F05D 2260/96* (2013.01)

(58) Field of Classification Search
CPC ........... F01D 15/12; F01D 5/10; F01D 25/04; F04D 29/668; F05D 2260/96; F05D 2260/4031; F05D 2260/40311; F02C 7/36
USPC ......... 415/119, 122.1, 124.2, 124.1, 229, 500
See application file for complete search history.

(56) References Cited

U.S. PATENT DOCUMENTS

| 4,213,661 A | 7/1980 | Marmol |
| 4,679,464 A | 7/1987 | Castellani |

(Continued)

FOREIGN PATENT DOCUMENTS

| EP | 2339146 | 6/2011 |
| JP | 61286531 | 12/1986 |
| WO | 9527860 | 10/1995 |

OTHER PUBLICATIONS

International Search Report for PCT Application No. PCT/US2013/033643, Jul. 2, 2013.

(Continued)

*Primary Examiner* — Dwayne J White
*Assistant Examiner* — William Grigos
(74) *Attorney, Agent, or Firm* — Carlson, Gaskey & Olds, P.C.

(57) ABSTRACT

A gas turbine engine includes a fan section, a turbine section coupled to the fan section through a geared architecture, a first member supporting the geared architecture, and a second member supporting the first member relative to an engine static structure. The first member and the second members are spaced apart from one another at a location. A damper includes opposing ends and extending between the first member and the second member at the location for limiting relative movement between the first member and the second member. A fan drive gear system and a method are also disclosed.

30 Claims, 2 Drawing Sheets

(51) Int. Cl.
*F02C 7/36* (2006.01)
*F02K 3/06* (2006.01)

(56) References Cited

U.S. PATENT DOCUMENTS

| | | | |
|---|---|---|---|
| 4,856,377 A | 8/1989 | Goudreau et al. | |
| 5,433,674 A * | 7/1995 | Sheridan et al. | 475/346 |
| 6,183,388 B1 | 2/2001 | Hawkins | |
| 6,663,526 B2 | 12/2003 | Janson | |
| 7,485,066 B2 | 2/2009 | Bailey et al. | |
| 7,704,178 B2 * | 4/2010 | Sheridan et al. | 475/159 |
| 7,959,406 B2 | 6/2011 | Suciu et al. | |
| 8,529,197 B1 * | 9/2013 | Coffin et al. | 415/119 |
| 8,573,926 B2 * | 11/2013 | Coffin et al. | 415/119 |
| 8,827,633 B2 * | 9/2014 | Coffin et al. | 415/119 |
| 2010/0034657 A1 | 2/2010 | Hunt et al. | |
| 2010/0105516 A1 * | 4/2010 | Sheridan et al. | 475/346 |
| 2011/0123326 A1 | 5/2011 | DiBenedetto et al. | |
| 2011/0130246 A1 | 6/2011 | McCune et al. | |

OTHER PUBLICATIONS

International Preliminary Report on Patentability for PCT Application No. PCT/US2013/033643, mailed Oct. 9, 2014.

* cited by examiner

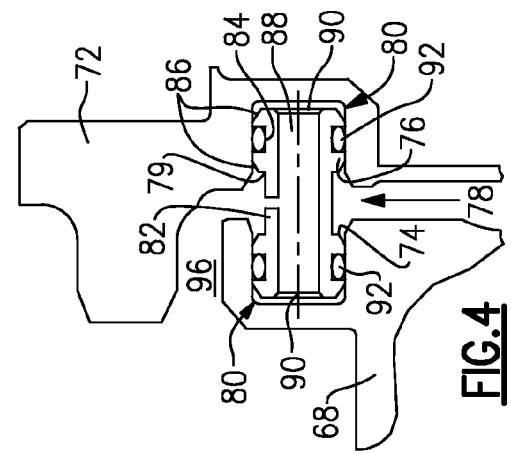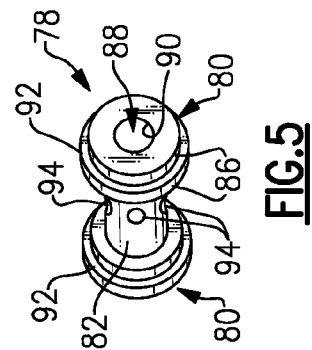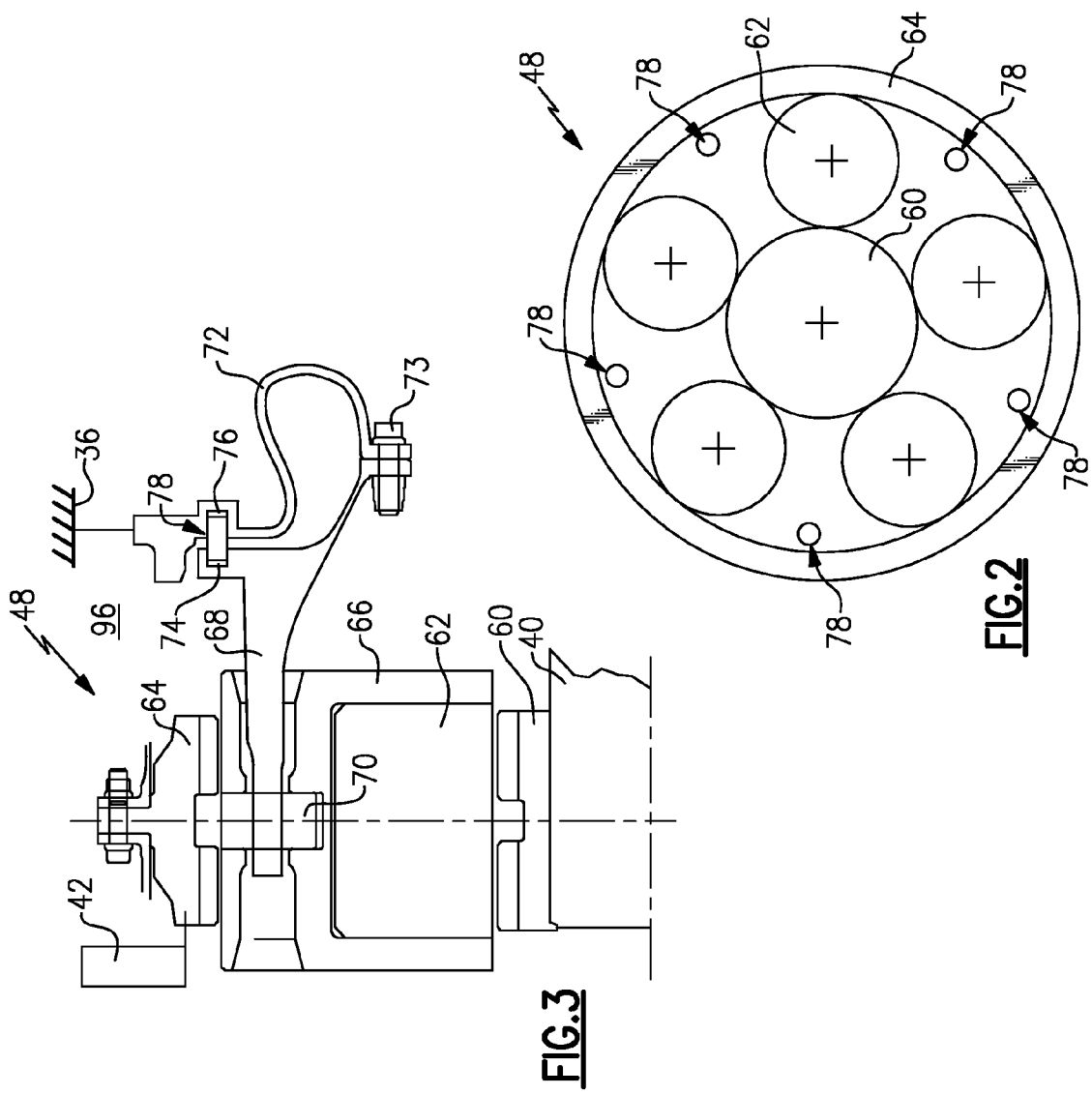

GAS TURBINE ENGINE FAN DRIVE GEAR SYSTEM DAMPER

CROSS-REFERENCE TO RELATED APPLICATION

This application is a continuation of U.S. patent application Ser. No. 14/036,927, filed on Sep. 25, 2013, which is a continuation of U.S. patent application Ser. No. 13/557,515, filed Jul. 25, 2012, now U.S. Pat. No. 8,573,926 granted Nov. 5, 2013, which is a continuation of U.S. patent application Ser. No. 13/432,699 filed Mar. 28, 2012, now U.S. Pat. No. 8,529,197 granted Sep. 10, 2013.

BACKGROUND

This disclosure relates to a damper for a fan drive gear system for a gas turbine engine.

Gear trains are used in gas turbine engines to provide a gear reduction between a turbine section and a fan, for example. The gear train is supported relative to a static structure. During operation, the gear train generates vibrational inputs to the static structure and other components, which may be undesirable. Additionally, the supporting structure may transmit vibrational inputs to the fan drive gear system that may be coincident or undesirable to the fan drive gear system. Typically, a flex support having a bellow secures the gear train to the static structure to permit some relative movement between the gear train and the static structure.

SUMMARY

A gas turbine engine according to an exemplary embodiment of this disclosure, among other possible things includes a fan section, a turbine section coupled to the fan section through a geared architecture, a first member supporting the geared architecture, and a second member supporting the first member relative to an engine static structure. The first member and the second members are spaced apart from one another at a location. A damper includes opposing ends and extending between the first member and the second member at the location for limiting relative movement between the first member and the second member.

In a further embodiment of any of the foregoing gas turbine engines, the damper includes a seal on each of the opposing ends with the seal on each end engaged to a corresponding one of the first member and the second member.

In a further embodiment of any of the foregoing gas turbine engines, the damper includes a tube having opposing ends each with an annular groove for receiving the seal.

In a further embodiment of any of the foregoing gas turbine engines, the first member is a torque frame and the second member is a flex support having a bellow, the flex support grounded to a static structure.

In a further embodiment of any of the foregoing gas turbine engines, the torque frame and flex support are secured to one another in an area spaced radially inward from the location.

In a further embodiment of any of the foregoing gas turbine engines, the torque frame and the flex support include first and second apertures disposed at the location that are aligned axially and that receive a corresponding one of the opposing ends of the damper.

In a further embodiment of any of the foregoing gas turbine engines, at least one of the torque frame and the flex support is configured to generate a vibrational input during operation and the damper is configured to damp the vibrational input.

In a further embodiment of any of the foregoing gas turbine engines, each opposing end includes annular tapers extending radially inward away from the respective end's annular groove and configured to permit articulation of the damper relative to the torque frame and the flex support.

In a further embodiment of any of the foregoing gas turbine engines, the first and second apertures and the damper are aligned parallel to an engine longitudinal axis for damping vibrational input in an axial direction.

In a further embodiment of any of the foregoing gas turbine engines, the flex support has a bellow attached to the torque frame and multiple dampers are arranged circumferentially between the torque frame and the flex support.

In a further embodiment of any of the foregoing gas turbine engines, the torque frame supports a carrier to which star gears are mounted, a sun gear is arranged centrally relative to and intermeshing with the star gears, and a ring gear circumscribes and intermeshes with the star gears.

In a further embodiment of any of the foregoing gas turbine engines, includes a compressor section including a first compressor and a second compressor and a combustor in communication with the compressor section. The turbine section includes a fan drive turbine coupled to drive the fan section through the geared architecture and a second turbine forward of the fan drive turbine.

In a further embodiment of any of the foregoing gas turbine engines, the geared architecture is configured to provide a speed reduction between the fan section and the fan drive turbine greater than about 2.3:1.

In a further embodiment of any of the foregoing gas turbine engines, the gas turbine engine is a high bypass geared aircraft engine having a bypass ratio of greater than about six (6).

In a further embodiment of any of the foregoing gas turbine engines, the bypass ratio is greater than about ten (10).

In a further embodiment of any of the foregoing gas turbine engines, the gas turbine engine includes a Fan Pressure Ratio of less than about 1.45.

In a further embodiment of any of the foregoing gas turbine engines, a fan tip speed is less than about 1150 ft/second.

In a further embodiment of any of the foregoing gas turbine engines, the fan drive turbine has a pressure ratio that is greater than about 5.

In a further embodiment of any of the foregoing gas turbine engines, the second turbine includes at least two rotational turbine blade stages.

In a further embodiment of any of the foregoing gas turbine engines, the fan drive turbine rotates in a direction opposite the second turbine.

A fan drive gear system according to an exemplary embodiment of this disclosure, among other possible things includes a first member supporting a geared architecture, and a second member supporting the first member relative to a static structure. The first member and the second members are spaced apart from one another at a location. A damper includes opposing ends and extending between the first member and the second member at the location for limiting relative movement between the first member and the second member.

In a further embodiment of any of the foregoing fan drive gear systems, the damper includes a seal on each of the opposing ends with the seal on each end engaged to a corresponding one of the first member and the second member.

In a further embodiment of any of the foregoing fan drive gear systems, the damper includes a tube having opposing ends each with an annular groove for receiving the seal.

In a further embodiment of any of the foregoing fan drive gear systems, the first member is a torque frame and the second member is a flex support having a bellow, the flex support grounded to a static structure.

In a further embodiment of any of the foregoing fan drive gear systems, at least one of the torque frame and the flex support is configured to generate a vibrational input during operation and the damper is configured to damp the vibrational input.

A method of designing a gas turbine engine according to an exemplary embodiment of this disclosure, among other possible things includes defining a first member for supporting a geared architecture, configuring a second member supporting the first member relative to an engine static structure, the first member and the second members are configured to be spaced apart from one another at a location, and configuring a damper including opposing ends that extend between the first member and the second member at the location for limiting relative movement between the first member and the second member.

In a further embodiment of any of the foregoing methods, includes defining the damper to include a seal on each of the opposing ends with the seal on each end engaged to a corresponding one of the first member and the second member.

In a further embodiment of any of the foregoing methods, includes configuring the damper to include a tube having opposing ends each with an annular groove for receiving the seal.

In a further embodiment of any of the foregoing methods, includes configuring the first member as a torque frame and the second member as a flex support having a bellow. The flex support is configured for grounding to the static structure.

In a further embodiment of any of the foregoing methods, includes defining the torque frame and the flex support to include first and second apertures disposed at the location that are aligned axially and configuring the first and second apertures to receive a corresponding one of the opposing ends of the damper.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The disclosure can be further understood by reference to the following detailed description when considered in connection with the accompanying drawings wherein:

FIG. 2 is a schematic view of an epicyclic gear train embodiment for a fan drive gear system.

FIG. 3 is a partial cross-sectional schematic view of a fan drive gear system embodiment.

FIG. 4 is an enlarged view of a portion of the fan drive gear system shown in FIG. 2.

FIG. 5 is a perspective view of a damper embodiment shown in FIG. 4.

DETAILED DESCRIPTION

Figure 1:
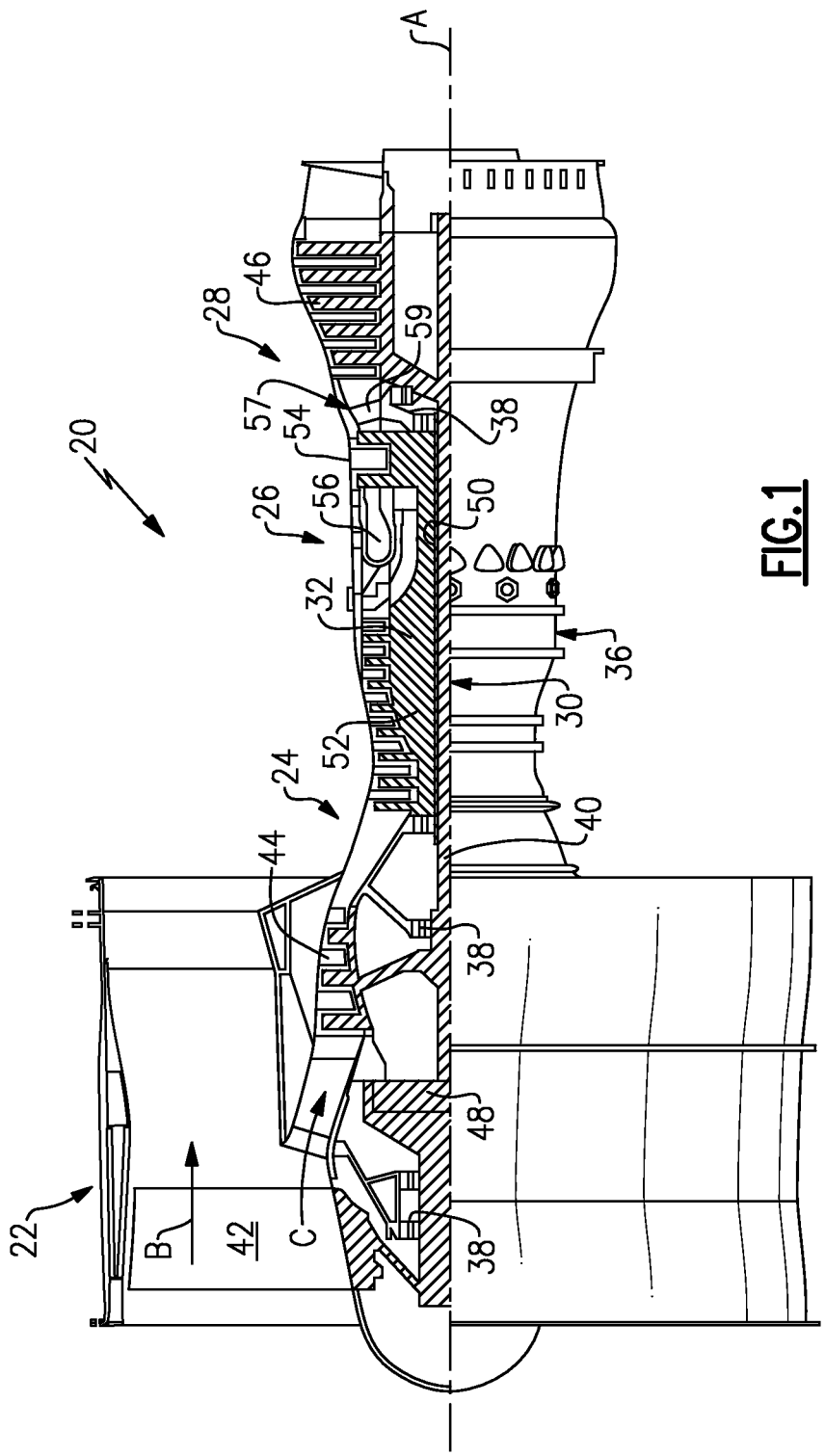
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

An example geared architecture 48 is schematically shown in a gear compartment 96 in FIGS. 2 and 3. The geared architecture 48 includes a sun gear 60, which is coupled to the inner shaft 40, as illustrated in FIG. 3. Star gears 62 are arranged circumferentially about the sun gear 60 and intermesh with the sun gear 60 and a ring gear 64, which circumscribes the star gear 62. In one example, the ring gear 64 is coupled to the fan 42. It should be understood that the geared architecture 48 illustrated in FIGS. 2 and 3 is exemplary only and can be configured other than illustrated.

A carrier 66 supports the star gears 62 relative to the sun gear 60 and ring gear 64. A torque frame 68 is connected to the carrier 66 by pins 70. The torque frame 68 is secured to the static structure 36 by a flex support 72, which has a bellow for permitting slight movement of the geared architecture 48 relative to the static structure 36. In the example, fasteners 73 secure the torque frame 68 and the flex support 72, which are metallic in one example, to one another to facilitate assembly and disassembly of the geared architecture 48. However, the torque frame 68 and flex support 72 are also spaced apart from one another in an axial direction at a location radially outward from the fasteners 73.

Referring to FIGS. 3 and 4, the torque frame 68 and flex support 72 respectively include first and second apertures 74, 76 that are aligned with one another in the axial direction. A damper 78, which is metallic in one example, is provided between the torque frame 68 and flex support 72 and received within the first and second apertures 74, 76, the geared architecture 48, provide desired stiffness and/or avoid natural frequencies. In one example, multiple dampers are arranged circumferentially between the torque frame 68 and flex support 72, as illustrated in FIG. 2. It should be understood that the dampers 78 may be configured in any desirable configuration and more or fewer dampers 78 may be used than illustrated.

Referring to FIGS. 4 and 5, the damper 78 is provided by a tube 79 includes opposing ends 80 with a neck 82 arranged between the ends 80. The neck 82 has a diameter that is smaller than a diameter of the ends 80. Each end 80 includes an annular groove 84 that receives a seal 92. Lateral sides 86 are provided on each end 80 with the annular groove 84 arranged between the lateral sides 86. The lateral sides 86 provide an annular taper that extends radially inward from the annular groove 84. The smaller diameter neck 82 and the tapered lateral sides 86 enables the damper 78 to articulate within the first and second apertures 74, 76 about the seals 92 during vibrations without permitting metal-to-metal contact between the damper 78 and the torque frame 68 or the flex support 72.

The damper 78 includes a cavity 88 that extends along its axial length between openings 90 provided at each end 80. The cavity 88 provides a viscous damping chamber. One or more orifices 94 are provided in the neck 82, for example, and are in fluid communication with the cavity 88. The orifices 94 permit an oil-mist in the gear compartment 96 to enter the cavity 88. Any oil collecting in the cavity 88 may drain through the orifices 94. The volume of the cavity 88 and the size, number and configuration of the orifices 94 are configured to damp a vibrational input from the geared architecture 48.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a fan section;
   a turbine section coupled to the fan section through a geared architecture;
   a first member supporting the geared architecture;
   a second member supporting the first member relative to an engine static structure, wherein the first member and the second members are spaced apart from one another at a gap; and
   a damper bridging the gap and including opposing ends and engaging the first member and the second member for limiting relative movement between the first member and the second member.

2. The gas turbine engine as recited in claim 1, wherein the damper includes a seal on each of the opposing ends with the seal on each end engaged to a corresponding one of the first member and the second member.

3. The gas turbine engine as recited in claim 2, wherein the damper comprises a tube having opposing ends each with an annular groove for receiving the seal.

4. The gas turbine engine as recited in claim 2, wherein the first member is a torque frame and the second member is a flex support having a bellow, the flex support grounded to a static structure.

5. The gas turbine engine as recited in claim 4, wherein the gap and damper are provided at a location, and the torque frame and flex support are secured to one another in an area spaced radially inward from the location.

6. The gas turbine engine as recited in claim 5, wherein the torque frame and the flex support include first and second apertures disposed at the location that are aligned axially and that receive a corresponding one of the opposing ends of the damper.

7. The gas turbine engine as recited in claim 6, wherein at least one of the torque frame and the flex support is configured to generate a vibrational input during operation and the damper is configured to damp the vibrational input.

8. The gas turbine engine as recited in claim 6, wherein the first and second apertures and the damper are aligned parallel to an engine longitudinal axis for damping vibrational input in an axial direction.

9. The gas turbine engine as recited in claim 4, wherein the flex support has a bellow attached to the torque frame and multiple dampers are arranged circumferentially between the torque frame and the flex support, and the gap is provided in an axial direction.

10. The gas turbine engine as recited in claim 9, wherein the torque frame supports a carrier to which star gears are mounted, a sun gear is arranged centrally relative to and intermeshing with the star gears, and a ring gear circumscribes and intermeshes with the star gears.

11. The gas turbine engine as recited in claim 10, including a compressor section comprising a first compressor and a second compressor and a combustor in communication with the compressor section, wherein the turbine section includes a fan drive turbine coupled to drive the fan section through the geared architecture and a second turbine forward of the fan drive turbine.

12. The gas turbine engine as recited in claim 11, wherein the geared architecture is configured to provide a speed reduction between the fan section and the fan drive turbine greater than about 2.3:1.

13. The gas turbine engine as recited in claim 12, wherein the gas turbine engine is a high bypass geared aircraft engine having a bypass ratio of greater than about six (6).

14. The gas turbine engine as recited in claim 13, wherein the bypass ratio is greater than about ten (10).

15. The gas turbine engine as recited in claim 14, wherein the gas turbine engine includes a Fan Pressure Ratio of less than about 1.45.

16. The gas turbine engine as recited in claim 15, wherein a fan tip speed is less than about 1150 ft/second.

17. The gas turbine engine as recited in claim 16, wherein the fan drive turbine has a pressure ratio that is greater than about 5.

18. The gas turbine engine as recited in claim 17, wherein the second turbine includes at least two rotational turbine blade stages.

19. The gas turbine engine as recited in claim 18, wherein the fan drive turbine rotates in a direction opposite the second turbine.

20. A fan drive gear system comprising;
a first member supporting a geared architecture;
a second member supporting the first member relative to a static structure, wherein the first member and the second members are spaced apart from one another to provide a gap; and
a damper bridging the gap and including opposing ends and engaging the first member and the second member for limiting relative movement between the first member and the second member.

21. The fan drive gear system as recited in claim 20, wherein the damper includes a seal on each of the opposing ends with the seal on each end engaged to a corresponding one of the first member and the second member.

22. The fan drive gear system as recited in claim 21, wherein the damper comprises a tube having opposing ends each with an annular groove for receiving the seal.

23. The fan drive gear system as recited in claim 21, wherein the first member is a torque frame and the second member is a flex support having a bellow, the flex support grounded to a static structure.

24. The fan drive gear system as recited in claim 23, wherein at least one of the torque frame and the flex support is configured to generate a vibrational input during operation and the damper is configured to damp the vibrational input.

25. A method of designing a gas turbine engine comprising:
defining a first member for supporting a geared architecture;
configuring a second member supporting the first member relative to an engine static structure, wherein the first member and the second members are configured to be spaced apart from one another to provide a gap; and
configuring a damper bridging the gap and including opposing ends that engage the first member and the second member for limiting relative movement between the first member and the second member.

26. The method as recited in claim 25, including defining the damper to include a seal on each of the opposing ends with the seal on each end engaged to a corresponding one of the first member and the second member.

27. The method as recited in claim 26, including configuring the damper to include a tube having opposing ends each with an annular groove for receiving the seal.

28. The method as recited in claim 26, including configuring the first member as a torque frame and the second member as a flex support having a bellow, wherein the flex support is configured for grounding to the static structure.

29. The method as recited in claim 28, including defining the torque frame and the flex support to include first and second apertures disposed that are aligned axially and configuring the first and second apertures to receive a corresponding one of the opposing ends of the damper.

30. A gas turbine engine comprising:
a fan section;
a turbine section coupled to the fan section through a geared architecture;
a first member supporting the geared architecture;
a second member supporting the first member relative to an engine static structure, wherein the first member and the second members are spaced apart from one another at a location; and
a damper including opposing ends and extending between the first member and the second member at the location for limiting relative movement between the first member and the second member, wherein the damper comprises a tube having opposing ends each with an annular groove for receiving a seal, wherein each opposing end includes annular tapers extending radially inward away from the respective end's annular groove and configured to permit articulation of the damper relative to the first and second members.

* * * * *